April 13, 1965  A. A. NEUWALD ETAL  3,178,255

AIR TREATMENT DEVICE

Filed Dec. 3, 1962  2 Sheets-Sheet 1

INVENTORS
ALFRED A. NEUWALD & WILLIAM F. DONOVAN
BY
ATTORNEYS

April 13, 1965 A. A. NEUWALD ETAL 3,178,255
AIR TREATMENT DEVICE

Filed Dec. 3, 1962 2 Sheets-Sheet 2

INVENTORS
ALFRED A. NEUWALD & WILLIAM F. DONOVAN
BY
ATTORNEYS

3,178,255
AIR TREATMENT DEVICE
Alfred A. Neuwald, New York, N.Y., and William F. Donovan, Clifton, N.J., assignors to The Fragrance Process Company, Inc., New York, N.Y.
Filed Dec. 3, 1962, Ser. No. 241,803
3 Claims. (Cl. 21—122)

This invention relates in general to air treating or conditioning devices and in particular to a new and useful device for purifying and selectively scenting fluids such as air.

Prior to the present invention devices have been known for purifying air and similar fluids by directing the air through filtering elements. The present invention is an improvement over devices of this nature, particularly in respect to the compact construction and arrangement of the various means for circulating air through selective filtering elements, over a sterilizing element and through a separate means for adding a vapor such as a perfume, medicinal spray, etc., to the air. A feature of the construction is that means are provided for adding a vaporizable material in measured quantities to the air which is purified.

In accordance with a preferred arrangement of the invention the means for adding vapors to the air include means for selectively dispensing a measured quantity of vaporizable liquid onto a heating element over or near which the air is circulated. With an arrangement of this character it is possible to add measured quantities of vaporizable liquids which may, for example, comprise insecticides, scented liquids, medicinal liquids such as cold sprays, etc.

A further feature of the invention is that the device advantageously comprises a compact unit which includes a fan for drawing air inwardly over a filtering assembly including, for example, a fiber glass layer and a material layer such as activated carbon for combining removing a major portion of undesirable solid constituents from the air such as dust, smoke and dirt.

A fan is arranged to discharge the purified air either directly into a vaporizable compartment or first over a sterilizing lamp which may be arranged in such compartment. The sterilizing lamp is advantageously made removable so that in those instances where it is not desirable to sterilize the air the sterilizing lamp may be easily removed. In the vaporizing chamber means are provided to withdraw liquid at variable controlled rates so that the quantity of liquid which is vaporized and added to the air which is circulated may be accurately controlled. The device advantageously includes means for easily changing a container for the vaporizable liquid in the event that it is desired to change from one type of compatible vaporizable liquid to another.

Accordingly, it is an object of this invention to provide a device for purifying and adding a controlled quantity of vaporizable substance to a fluid such as air.

A further object of the invention is to provide a compact unit including means for moving air through a filtering element and directing it into association with a generated vapor which vapor may comprise, for example, a medicant, an insecticide, scented material such as perfume, chocolate aroma, etc.

A further object of the invention is to provide an air purifying and conditioning device which includes means for moving air through a compartment in which a vaporizable liquid is continuously vaporized.

A further object of the invention is to provide a compact unit including a housing having a fan arranged to draw fluid such as air through a filtering element and into a compartment in which a liquid is continuously vaporized and including a removable sterilizing means arranged in the compartment in the path of air flow.

A further object of the invention is to provide an air purifying and scenting device including removable sterilizing means.

A further object of the invention is to provide an air treatment device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
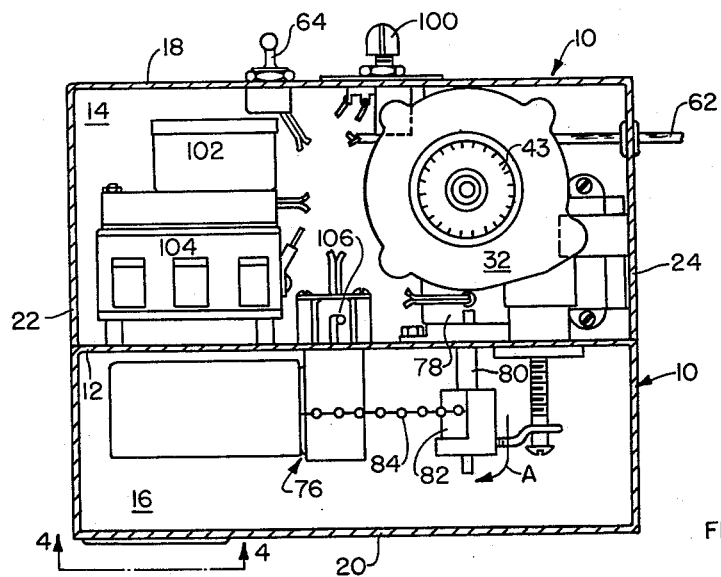
FIG. 1 is a horizontal section taken on the line 1—1 of FIG. 3 of an air conditioning device constructed in accordance with the invention.

Referring to the drawings in particular, the invention embodied therein in FIGS. 1 to 5 includes a combination air purifying and air treatment device generally designated 10 which comprises a housing divided by a partition wall 12 into an operating part and intake chamber 14 and a vaporizing and sterilizing chamber 16. The housing of the unit advantageously includes a front wall 18, rear wall 20, side walls 22 and 24, top wall 26, a bottom wall 27, and an inclined upper front wall 28. The inclined front wall and the rear wall 20 are hinged to opposite ends of the top wall 26 to permit easy opening and access to the parts of the device.

An operating motor 30 is mounted in the chamber 14 and it drives a centrifugal squirrel-cage type of fan 32. Air is drawn in through suitable openings in the inclined front wall 28 over a filtering assembly generally designated 34 which is removably mounted on ledge elements 36 and 38 at the upper end of the compartment 14. In accordance with one feature of the invention the filtering assembly 34 advantageously includes a bat or assembly made up of one or a plurality of layers of fiber glass material 40 and a layer of a substance such as activated carbon 42 for removing undesirable constituents from the air such as smoke, dirt, etc.

The fan 32 includes a central inlet 43 and a peripheral discharge which is arranged to discharge through a tubular passage 44 which has an opening 50 extending into the chamber 16.

In accordance with another feature of the invention the top wall 26 is provided with an opening 52 to permit the insertion of a tubular sterilizing assembly generally designated 54. The sterilizing assembly 54 includes an outer tubular member 56 which is fitted over a socket element 58 mounted on the bottom wall 27 of the unit. The socket element 58 is connected electrically by means of an outlet cord 62 which also connects through a multi-selection switch 64. The tube 56 is provided with means for holding and electrically connecting a sterilizing lamp 66. The tube 56 also is provided with a tubular extension 68 which fits around an extension of the tube 42 from the discharge of the fan 32. Air which is drawn inwardly into the compartment 14 by the fan 32 moves through the filtering assembly 34 and is purified. It is then discharged through the tube 42 into the tube 56 where it is deflected by baffle plate 70 in upward and downward directions for discharge through openings 72 and 74 at the upper and lower end of the tube 56, respectively.

A feature of the construction is that the air may be discharged from the tube 42 into the compartment 16 without first passing through the sterilizing assembly 54. This may be done by removing the sterilizing assembly through the opening 52.

Figure 2:
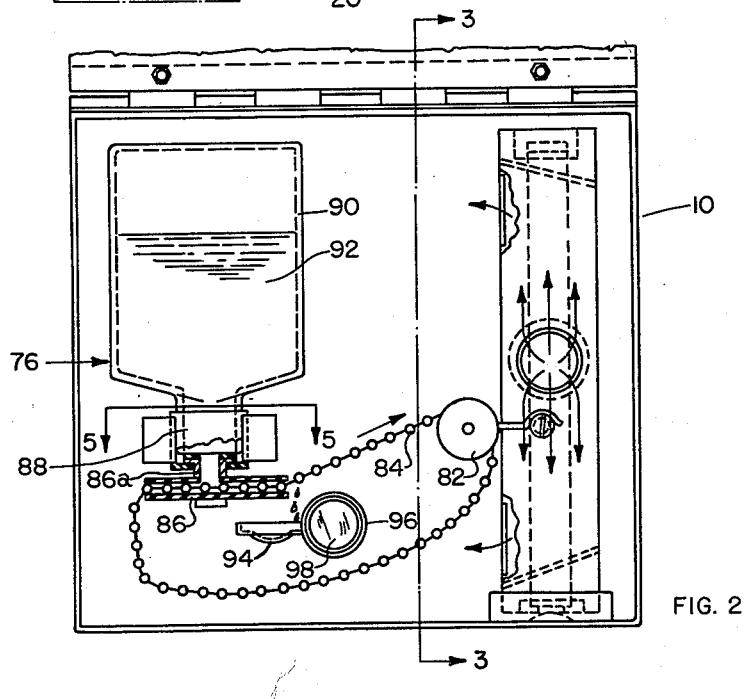
FIG. 2 is a rear elevation with the cover open and only partially indicated.
Figure 3:
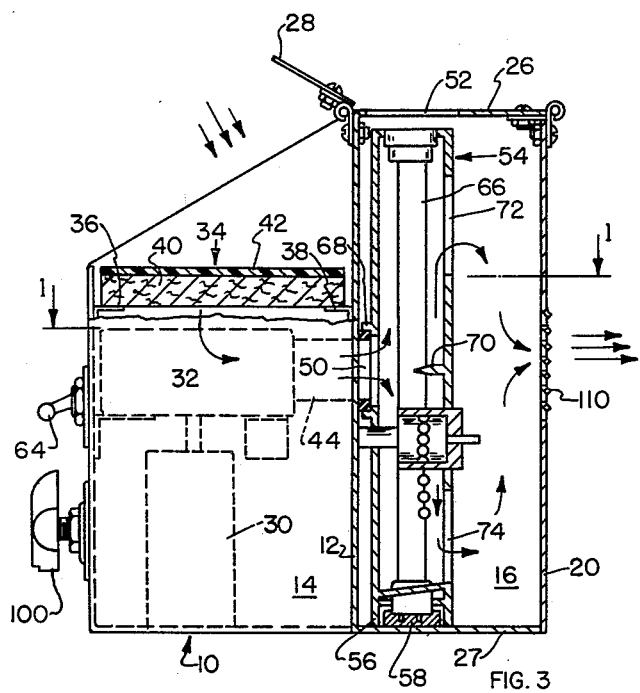
FIG. 3 is a vertical section taken on the line 3—3 of FIG. 2.
Figure 4:
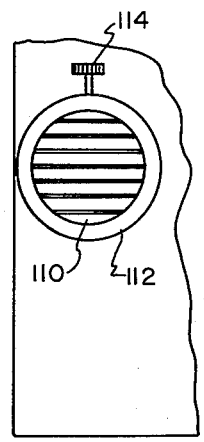
FIG. 4 is a partial rear elevation of the device with the cover closed indicating the discharge louvered opening.
Figure 5:
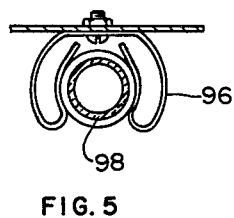
FIG. 5 is a section taken on the line 5—5 of FIG. 2.

After the air has passed either first through the sterilizing assembly or directly into the compartment 16 without first passing through the sterilizing assembly, it is directed past vaporizing means generally designated 76 (FIGS. 1 and 2). The vaporizing means 76 includes a motor 78 arranged to drive, through a shaft 80, a cylindrical element 82 having notches in which is guided an endless chain 84. The other end of the endless chain 84 is passed through a flexible T-shaped tubular element 86 which has a central portion 86a which is fitted into a cylindrical dispensing cap 88 which is adapted to receive a container 90 having a vaporizable liquid 92. The cap 88 is constructed so that a container 90 may be easily inserted into or removed therefrom. Liquid 92 in the container flows downwardly by gravity to the end of the central portion 86a of the T-shaped flexible member 86. The chain 84 which is moved through the tubular element 86 in close-fitting engagement therewith will pick up liquid from the portion 86a and advance outwardly to one end of the tubular element 86 when the cylindrical member 82 is rotated by the motor 78. Directly beneath this end of the tubular element 86 is arranged a small pan 94 which is formed as an extension of a coiled piece of metal 96. Within the coil portion of the piece of metal 96 is arranged a heating bulb 98. Liquid which is discharged by the chain 84 drips downwardly onto the pan 94 and is vaporized by the heat of the lamp 98 so that it forms as a vapor in the compartment 16.

Means are provided such as a control switching mechanism 100 and the variable switch 64 to operate the device entirely as a purifier and device for treating air by adding vapor thereto, as a purifier and device for sterilizing the air and/or adding vapor thereto, and as a purifier alone. The multi-switch 64 and the control switch 100 are connected electrically to control means such as variable resistors 102 and 104 mounted in compartment 14 and connected electrically to a motor 78 for the vaporizing unit 76 and to the motor 30 for the fan 32. In addition, the switching elements are connected to the socket 106 for the lamp 98 which lamp is only switched on when the cylindrical member 82 is rotated by actuation of the motor 78. The switching is thus that the fan 32 is always operated when the device is switched on, but the vaporizing means 76 and the sterilizing means 54 may be disconnected, if desired.

In the embodiments indicated in FIGS. 1 to 4 air is directed outwardly into one end of the compartment 16, and then along the compartment as indicated by the arrow A in FIG. 1. Air thus directed will pick up the vaporized liquid and thereafter the air is directed outwardly through louvres 110 arranged in the rear wall 20. The louvres 110 are advantageously arranged as a cylindrical piece which may be rotated in a collar mounting 112 by moving a control handle 114 in order to selectively direct the air as desired.

Figure 6:
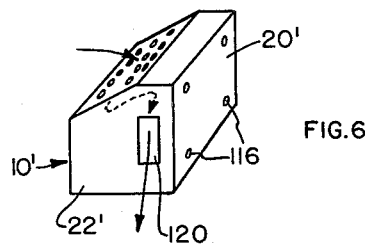
FIG. 6 is a perspective view on a reduced scale of another embodiment of the invention.

In the embodiment indicated in FIG. 6 there is shown a unit 10' which includes a rear wall 20' which may be mounted directly on a wall by means of bolts extending through openings 116. In this embodiment air is discharged through an opening 120 arranged in the end wall 22'.

Thus the invention provides means for simply and easily treating air in order to affect the characteristics thereof. Air may be treated in order to purify the air and remove all the dust, dirt and undesirable characteristics therefrom or things which may cause discomfort when breathed. For this purpose the filtering assembly 34 advantageously includes a removable assembly which may be easily replaced by opening the inclined front wall 28. The elements of this filtering assembly advantageously include means for removing undesirable constituents of the air in accordance with selective preferences. In the preferred arrangement activated carbon removes most of the smoke and undesirable dust particles along with the fiber glass which also removes pollen and materials of this nature.

The air which has been purified may also be sterilized by sterilizing lamp 66 which may be connected into the device or removed from the assembly as desired. The principle feature of the device is means for controlling the amount of vapor which is added to the air which is discharged from the unit. With the invention it is possible to add controlled amounts of insecticide, for example, when the device is to be employed as a continuously operating device for ridding the area of insects.

The device may also be operated as a means for adding a controlled amount of scent to the air. For example, food scents, perfume scents, etc. may be added in selective quantities. The variations may be effected by controlling the speed of operation of the motor 78 and thus the advance of the liquid from the container to regulate the amount of material which is vaporized at a given period of time. In still other instances it is desirable to employ a liquid such as a medicant which may comprise a preparation for relieving discomfort in nasal passages due to cold, hay fever, etc.

While specific embodiments of the invention have been shown and described in detail to illustrate the application of the inventive principles, it will be understood that the invention may be embodied otherwise without departing from such principles.

We claim:

1. A fluid treatment device comprising a housing, a partition wall dividing said housing into a filtering chamber and a vaporizing chamber and including an opening communicating said filtering chamber with said vaporizing chamber, an inlet disposed at one end of said filtering chamber, a filtering element disposed in said chamber extending thereacross, fan means in said filtering chamber arrangement to draw fluid into said inlet and through said filtering element and to discharge said fluid through the partition wall opening into said vaporizing chamber, a discharge opening defined in said housing at the location of said vaporizing chamber, means in said vaporizing chamber for vaporizing a liquid in controlled amounts to add vapor to the air as it is circulated by said fan means, and separate control means for independently operating said vaporizing means and said fans means, said vaporizing means includes means for supporting a vaporizable liquid container in an inverted position, a flexible tubular element connected to said supporting means including a central portion adapted to communicate with the interior of the container held on said supporting means, and a portion extending at an angle thereto, an endless chain extending through said flexible tubular element at the portion extending at an angle to said central portion, and means for rotating said chain at selective speeds whereby to pick up a measured quantity of vaporizable fluid and remove it from said container.

2. A fluid treatment device comprising a housing, a partition wall dividing said housing into a filtering chamber and a vaporizing chamber and including an opening communicating said filtering chamber with said vaporizing chamber, an inlet disposed at one end of said filtering chamber, a filtering element disposed in said chamber extending thereacross, fan means in said filtering chamber arranged to draw fluid into said inlet and through said filtering element and to discharge said fluid through the partition wall opening into said vaporizing chamber, a discharge opening defined in said housing at the location of said vaporizing chamber, means in said vaporizing chamber for vaporizing a liquid in controlled amounts to add vapor to the air as it is circulated by said fan means, separate control means for independently operating said vaporizing means and said fan means, said vaporizing means includes means for supporting a vaporizable liquid container in an inverted position, a flexible tubular element connected to said supporting means including a central portion adapted to communicate with the interior of the container held on said supporting means, a portion extending at an angle thereto, an endless chain extending through said flexible tubular element at the portion extending at an angle to said central portion, means for rotating said chain at selective speeds whereby to pick up a measured quantity of vaporizable fluid and remove it from said container, and a heating pan disposed at the discharge of said flexible tubular element.

3. A fluid treatment device comprising a housing, a partition wall dividing said housing into a filtering chamber and a vaporizing chamber and including an opening communicating said filtering chamber with said vaporizing chamber, an inlet disposed at one end of said filtering chamber, a filtering element disposed in said chamber extending thereacross, fan means in said filtering chamber arranged to draw fluid into said inlet and through said filtering element and to discharge said fluid through the partition wall opening into said vaporizing chamber, a discharge opening defined in said housing at the location of said vaporizing chamber, means in said vaporizing chamber for vaporizing a liquid in controlled amounts to add vapor to the air as it is circulated by said fan means, separate control means for independently operating said vaporizing means and said fan means, said vaporizing means includes means for supporting a vaporizable liquid container in an inverted position, a flexible tubular element connected to said supporting means including a central portion adapted to communicate with the interior of the container held on said supporting means, a portion extending at an angle thereto, an endless chain extending through said flexible tubular element at the portion extending at an angle to said central portion, means for rotating said chain at selective speeds whereby to pick up a measured quantity of vaporizable fluid and remove it from said container, a heating pan disposed at the discharge of said flexible tubular element, and an electric lamp adjacent said heating pan adapted to heat said heating pan.

References Cited by the Examiner

UNITED STATES PATENTS

| | | | |
|---|---|---|---|
| 2,244,180 | 6/41 | Williams et al. | 21—119 |
| 2,308,138 | 1/43 | Williams | 21—119 |
| 2,312,730 | 3/43 | Ring | 222—365 X |
| 2,361,663 | 10/44 | Stine | 222—365 X |
| 2,662,332 | 12/53 | McIntire | 21—119 |
| 2,664,604 | 1/54 | Hein et al. | 21—74 |
| 2,732,501 | 1/56 | Blaeker | 21—74 |
| 2,758,412 | 8/56 | Loibl | 21—119 |
| 3,071,828 | 1/63 | Cornell | 21—74 |

DONALL H. SYLVESTER, *Primary Examiner.*

MORRIS O. WOLK, *Examiner.*